United States Patent [19]

Watanabe et al.

[11] 4,046,959
[45] Sept. 6, 1977

[54] DATA COMMUNICATION SYSTEM USING PHOTOCOUPLERS

[75] Inventors: Kazutaka Watanabe; Misao Shimizu; Akihiro Sugawara, all of Musashino, Japan

[73] Assignee: Kabushikikaisha Yokogawa Denki Seisakusho, Tokyo, Japan

[21] Appl. No.: 693,689

[22] Filed: June 7, 1976

[30] Foreign Application Priority Data

June 13, 1975 Japan .................... 50-71504

[51] Int. Cl.$^2$ .............................. H04L 15/00
[52] U.S. Cl. .................... 178/68; 178/58 A
[58] Field of Search ............ 178/50, 58 R, 58 A, 178/68; 250/199

[56] References Cited
U.S. PATENT DOCUMENTS 3,808,366  4/1974  Wanamaker et al. ............ 178/68

3,970,784  7/1976  Meijerink ........................ 178/58 A

*Primary Examiner*—Richard Murray
*Attorney, Agent, or Firm*—Moonray Kojima

[57] ABSTRACT

A data communication system comprising a master station and n number of substations, each substation comprising a receiving photocoupler and a transmission photocoupler, and wherein a particular substation may be connected into a transmission line leading to the master station by connecting the receiving photocoupler in series in parallel circuit to the transmission line and wherein data transmission from the master station to the substation is accomplished by means of a current supplied forward with respect to the receiving photocoupler of the substation, and data transmission from the substation to the master station is done by means of a current supplied reverse with respect to the transmission photocoupler of the substation.

5 Claims, 1 Drawing Figure

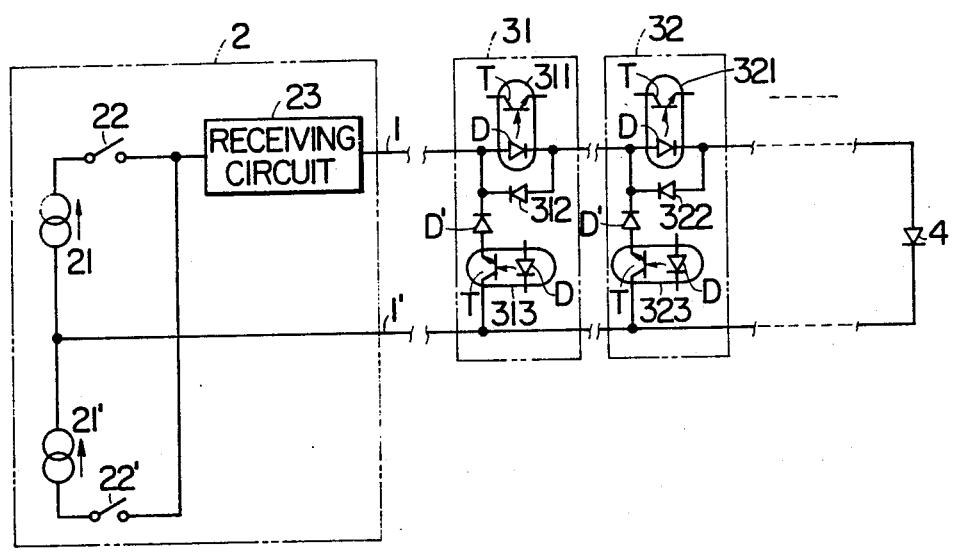

DATA COMMUNICATION SYSTEM USING PHOTOCOUPLERS

BACKGROUND OF THE INVENTION

This invention relates to data communication systems of the type using photocouplers.

In known data communication systems, the use of couplers is essential for coupling transmitters and receivers to communication lines, and such couplers are usually transformers. In practice, transformer couplers are generally costly and often require modifications in construction and dimensions depending upon the signal transmission rate of the communication system. Recently, with marked improvement in the quality of photocoupler, an increasing number of them have replaced transformer couplers. Advantageously, photocouplers can be manufactured at low cost and are small in size and operable over a wide range of signal transmission without the need for modifying their construction and dimensions. Therefore, by using photocouplers, the cost of a data communication system can be reduced.

SUMMARY OF THE INVENTION

It is therefore an object of the invention to provide a data communication system using photocouplers for coupling the transmitters and receivers to the transmission lines.

The foregoing and other objects are attained in this invention which encompasses a data transmission system comprising a master station and one or more substations with the master station having one or more direct current sources and switching means for changing the direction of current going to the substations when transmitting or receiving data and with each substation having a receiving photocoupler connectable in series circuit with the transmission line connected to the master station, a transmission photocoupler connectable in parallel circuit to the transmission line and a diode connected in parallel to the receiving photocoupler and a diode connected in series to the transmission photocoupler and a diode terminating the transmission line.

In operation, the switching means in the master station will direct the direct current signals of a predetermined code of one polarity to the receiving photocoupler of a particular substation for data transmission. The diode in the substation associated with the transmission photocoupler will block the transmitted signal. When the transmission from the master station ceases, the switching means will change the polarity of the signals of the transmission line with the change causing suitable reverse bias of the receiving photocoupler and the terminating diode. Each substation will detect the cease of transmission from the master station. Signals applied to the transmission photocoupler will be transmitted to the master station through the diode associated with the receiving photocoupler.

A feature of the invention is the use in a substation of the receiving photocoupler connected in series circuit to the transmission line and the transmitting photocoupler connected in parallel circuit to the transmission line together with the diode and the use in the master station of switching means and direct current means to enable data transmission from the master station to the receiving photocoupler of a particular substation and the transmission from any substation transmission photocoupler to the master station when the master station is not transmitting.

Another feature of the invention is the use of switching means and current source to change the bias of the substation and terminal diodes depending on the transmission or receive modes of the master station.

A further feature of the invention is placement of the diode associated with the transmission photocoupler across the transmission line and the diode associated with the receiving photocoupler in parallel with the transmission line and the diode terminating the transmission line.

Further objects, features and advantages of the present invention will become more apparent from the following description taken in conjunction with the accompanying drawing.

BRIEF DESCRIPTION OF THE DRAWING

The sole FIGURE depicts a schematic circuit diagram of an illustrative embodiment of the invention.

DESCRIPTION OF PREFERRED EMBODIMENTS

Referring now to the sole figure, a data communication system of this invention is depicted comprising a pair of transmission lines 1 and 1', a master station 2, a plurality of subsidiary stations 31, 32, . . . , and a diode 4 disposed at the termination of the transmission lines 1 and 1'. The master station 2 has a pair of constant DC current sources 21 and 21', with polarities disposed opposite to each other as depicted by the arrows, a transmission switch 22, a receiving switch 22', and a receiving circuit 23. The substation 31 comprises a receiving photocoupler 311 (which photocoupler comprises a phototransistor T and a light emitting diode D) connected in series circuit to the transmission line 1, a transmission photocoupler 313, (which comprises phototransistor T and light emitting diode D) connected in parallel to the transmission lines, a diode 312 associated with the receiving photocoupler 311, connected in parallel circuit to light emitting diode D of receiving photocoupler 311, and a diode D', associated with the transmitting photocoupler 313, connected parallel to light emitting diode D of transmitting photocoupler 313 and serially to the terminals of phototransistor T of transmitting photocoupler 313 and across the transmission lines, all as depicted. A receiving circuit (not shown) is connected to the phototransistor T of the receiving photocoupler 311; and a transmitting circuit (not shown) is connected to the light emitting diode D of the transmitting photocoupler 313. The operation of the photocouplers, e.g. 311 and 313, is well known and may be found in any reputable handbook and will not be repeated herein.

As depicted the other substations 32, etc, have similar elements as the just described substation 31. The numbering scheme used herein for similar elements in the different substations is 3$i$, with $i$ changing for the different substations, eg. 1,2,3, . . . etc.

The light emitting diode D of the receiving photocoupler 311 and terminal diode 4 are connected serially and in the same polarity to the transmission lines 1 and 1'. The phototransistor T of the the transmitting photocoupler 3$i$3 and the light emitting diode D are connected in parallel and in the same polarity across the transmission lines 1 and 1'.

In master station 2, constant DC current source 21 produces a current forward with respect to light emitting diode D of receiving photocoupler 3i1 of each subsidiary station. The constant DC curent source 21' produces a current reverse with respect to light emitting diode D of receiving photocoupler 3i1 and forward with respect to phototransistor T of transmitting photocoupler 3i3. The two currents are supplied to the transmission lines 1 and 1' through transmission switch 22 and receiving switch 22' respectively. The receiving circuit 23 detects the current from constant DC current source 21'. Although two DC current sources and two separate switches are shown, other switching means and one or more current sources may be used to produce the same operating effect.

The data communication system of the invention operates in the following manner. For data transmission from the master station 2 to a substation, for example 31, transmission switch 22 in master station 2 is turned on and off according to a predetermined serial pulse code of data to be transmitted. The resultant serial pulse current flows in transmission lines 1 and 1' through the receiving photocoupler 3i1 of each substation 3i and the terminating diode 4. Thus, the data is detected by a receiving circuit (not shown) connected to the receiving photocoupler 3i1 in each substation 3i, and the specific one of the substations, such as 31, receives at the receiving circuit (not shown) the data according to the address code contained in the data given. A reverse voltage applied to the phototransistor T of the transmission photocoupler 3i3 of each substation 3i is stopped by the diode D' in each substation.

Data transmission from a substation 3i to master station 2 is done where there is no data transmission from master station 2. When master station 2 ends transmitting data, transmission switch 22 is turned off and receiving switch 22' is turned on. As a result, the light emitting diode D of receiving photocouplers 3i1 of each substation 3i and the terminal diode 4 are reverse biased, and the current in transmission lines 1 and 1' becomes absent. Thus, each substation 3i detects from the output of its receiving photocoupler 3i1 the fact that data transmission from the master station 2 has ceased. In the particular substation, such as 31, from which data is to be transmitted to master station 2, and on-off current according to a predetermined serial pulse code of data to be transmitted, is supplied by a transmission circuit (not shown) to the light emitting diode D of transmitting photocoupler, for example 313. This causes the phototransistor T of the transmitting photocoupler, such as 313, to turn on and off, and the current from the constant DC current source 21' is caused to flow in transmission lines 1 and 1'. This current passes through diode 3i2 of each substation 3i, being reverse to the transmission data current from master station 2. Master station 2 detects current from transmitting substation, such as 31, at the receiving circuit 23, thus, receiving the data transmitted from the particular substation, such as 31.

In this data transmission system, the light emitting diode D of receiving photocoupler 3i1 of each substation 3i is connected in series circuit to the transmission lines, and the phototransistor T of the transmission photocoupler 3i3 of each substation 3i is connected across the transmission lines, as depicted. Thus, advantageously, the transmission lines remain unaffected even if any one or more substations become inoperative due to power break or other failure.

The data communication system of the invention has many advantages. For example, the photocouplers are utilized to efficiently couple the transmitters and receivers to the transmission lines. Also, because photocouplers are inexpensive, small in size and utilizable over a wide range of frequencies and transmission rates without necessity of modification of structure or dimensions, the cost of a data communication system employing such photocouplers is substantially reduced. Moreover, in transmitting data from the master station, a given current signal is substantially equal in value at each of the individual substations, irrespective of distances between the master station and the substations. Also, conversely, the current signals of data transmitting from any substation to the master station, is substantially equal in value at the master station, irrespective of the distance from a substation to the master station. Furthermore, advantageously, in this invention, the transmission lines remain unaffected even if any substation becomes inoperative.

Although one preferred embodiment of the invention has been disclosed herein, it is to be understood that this is for the purpose of illustrating the invention, and should not be construed as necessarily limiting the scope of the invention, since it is apparent that many changes may occur to those skilled in the art without departing from the true spirit of the invention.

What is claimed is:

1. A data communication system comprising
   a. a pair of transmission lines;
   b. a plurality of subsidiary stations, each comprising
      a first photocoupler having a light emitting element of rectifying property, connected serially to the pair of transmission lines,
      a diode connected in parallel and reverse in polarity to the first photocoupler, and
      a second photocoupler having photosensing element connected in parallel between the pair of transmission lines;
   c. a diode disposed at a point where the two transmission lines are terminated, the diode being in the same polarity as the light emitting element of the first photocoupler; and
   d. a master station comprising
      a first constant DC current source producing a current forward with respect to the light emitting element of the first photocoupler,
      a second constant DC current source producing a current reverse with respect to the light emitting element of the first photocoupler and forward with respect to the photosensing element of the second photocoupler,
      a transmission means for supplying a current from the first constant DC current source to the pair of transmission lines,
      and a receiving means for supplying a current from the second constant DC current source to the pair of transmission lines and for detecting the current supplied.

2. A data communication system comprising a master station for transmitting and receiving data signals in the transmission and receive modes respectively; a plurality of substations for receiving data transmitted from said master station and for transmitting data to said master station from selected ones of said substation; and a pair of transmission lines interconnecting said plurality of substations and said master station; wherein said master station comprises constant DC current source means, receiving circuit means, and switching means for selectively connecting said DC current source means of selected polarities to said pair of transmission lines depending on the transmission or receiving mode; and wherein each substation comprises a receiving photocoupler having a photosensing transistor and a light emitting diode with said light emitting diode of said receiving photocoupler being connected serially to said transmission lines; a transmitting photocoupler having a photosensing transistor and a light emitting diode with said photosensing transistor of said transmission photocoupler being connected in parallel circuit to said transmission lines; and unidirectional current means for preventing signals transmitted from said master station from being applied to said transmission photocoupler during the transmission mode and for preventing signals transmitted from said substation from being applied to said receiving photocoupler during the receive mode; and further comprising means for terminating said transmission lines.

3. The system of claim 2, wherein said current source means comprises a first constant DC current source disposed to produce a forward current with respect to said light emitting diode of said receiving photocoupler; and a second constant DC current source disposed to produce a forward current with respect to said photosensing transistor of said transmitting photocoupler; and wherein said switching means comprises a transmitting switch for connecting said first DC source into said transmission line when said master station is transmitting and a receiving switch for connecting said second DC source into said transmission line when said master station is receiving data from a substation.

4. The system of claim 2, wherein said terminating means comprises a diode positioned to have its polarity in the same direction as said light emitting diode of said receiving photocoupler.

5. The system of claim 2, wherein said unidirectional current means comprises a second diode disposed to prevent the signals transmitted from said master station from being applied to said transmitting photocoupler and first diode disposed to prevent the signals transmitted from said substation from being applied to said receiving photocoupler.

* * * * *